(12) United States Patent
Yoshida et al.

(10) Patent No.: US 9,403,584 B2
(45) Date of Patent: Aug. 2, 2016

(54) PRESSURE-RESISTANT CONTAINER AND EXPLORATION MACHINE PROVIDED WITH THE SAME

(71) Applicants: KYOCERA CORPORATION, Kyoto-Shi, Kyoto (JP); JAPAN AGENCY FOR MARINE-EARTH SCIENCE AND TECHNOLOGY, Yokosuka-shi, Kanagawa (JP)

(72) Inventors: Masao Yoshida, Kyoto (JP); Naoyuki Ookubo, Kyoto (JP); Kenichi Asakawa, Yokosuka (JP); Yosaku Maeda, Yokosuka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/646,613

(22) PCT Filed: May 20, 2013

(86) PCT No.: PCT/JP2013/063992
§ 371 (c)(1),
(2) Date: May 21, 2015

(87) PCT Pub. No.: WO2014/080650
PCT Pub. Date: May 30, 2014

(65) Prior Publication Data
US 2015/0314845 A1    Nov. 5, 2015

(30) Foreign Application Priority Data

Nov. 21, 2012    (JP) ................. 2012-255695

(51) Int. Cl.
*B63G 8/00*    (2006.01)
*B63G 8/04*    (2006.01)
(Continued)

(52) U.S. Cl.
CPC ........ *B63G 8/001* (2013.01); *B63G 8/04* (2013.01); *B65D 15/02* (2013.01); *B65D 81/02* (2013.01); *F16J 12/00* (2013.01); *G01V 3/40* (2013.01); *G01V 11/00* (2013.01)

(58) Field of Classification Search
USPC .......................................... 114/312; 220/581
IPC ............................................ B63G 8/001,8/04
See application file for complete search history.

(56) References Cited

U.S. PATENT DOCUMENTS

2011/0024431 A1    2/2011    Yano et al.
2013/0026172 A1    1/2013    Asakawa et al.

FOREIGN PATENT DOCUMENTS

JP    64-026065 A    1/1989
JP    2006-336472 A    12/2006
(Continued)

OTHER PUBLICATIONS

International Search Report dated Aug. 13, 2013 issued for International Application No. PCT/JP2013-063992.

*Primary Examiner* — Stephen Avila
(74) *Attorney, Agent, or Firm* — Procopio, Cory, Hargreaves & Savitch LLP

(57) ABSTRACT

There are provide a pressure-resistant container which is less likely to be damaged due to stress concentration even in deep seas of 1000 m or deeper below sea level, and an exploration machine provided with the same. A pressure-resistant container includes a cylindrical first outer shell member; and substantially hemispherical second outer shell members which are respectively connected to both ends of the first outer shell member, and is constructed by selecting materials so that a Young's modulus $E_2$ of a base material which constitutes the second outer shell members is smaller than a Young's modulus $E_1$ of a base material which constitutes the first outer shell member.

7 Claims, 9 Drawing Sheets

(51) Int. Cl.
*B65D 8/00* (2006.01)
*B65D 81/02* (2006.01)
*F16J 12/00* (2006.01)
*G01V 11/00* (2006.01)
*G01V 3/40* (2006.01)

(56) References Cited

FOREIGN PATENT DOCUMENTS

| WO | 2009-119421 A1 | 10/2009 |
| WO | 2011-122648 A1 | 10/2011 |

PRESSURE-RESISTANT CONTAINER AND EXPLORATION MACHINE PROVIDED WITH THE SAME

TECHNICAL FIELD

The present invention relates to a pressure-resistant container which houses a measurement device such as a magnetometer for seabed exploration and can realize high pressure resistance performance under high pressure of deep seas, and to an exploration machine provided with the same.

BACKGROUND ART

Among exploration devices which are used in deep seas exploration activity, there is an exploration device which stores the exploration device in a container of a pressure-resistant container, and is used in deep seas of 1000 m or deeper below sea level, for example. As a pressure-resistant container for storing the exploration device, in Patent Literature 1, a pressure-resistant container which includes a body portion which is a tube-shaped first outer shell member that has flange portions on outer circumferential sides of both end portions, and panel board portions which are hemispherical second outer shell members that are disposed at both ends of the body portion and have a flange portion on an outer circumferential side of an opening portion, in which the flange portions of the body portion and the panel board portion abut against each other to combine the flange portions by a bolt and a nut, and which is made of metal such as a titanium alloy, is suggested. In addition, in the pressure-resistant container, ceramic may be used instead of metal.

CITATION LIST

Patent Literature

Patent Literature 1: Japanese Unexamined Patent Publication JP-A 64-26065 (1989)

SUMMARY OF INVENTION

Technical Problem

However, in the metal-made pressure-resistant container described in Patent Literature 1, the members are made of the same material, regardless of a shape of the body portion which functions as the first outer shell member and a shape of the panel board portion which functions as the second outer shell member being different from each other. Therefore, for example, in deep seas of 1000 m or deeper below sea level, since unevenness in deformation among the members is generated by a difference in water pressure which is applied to the body portion and the panel board portion, there is a problem in that a connection portion between the body portion and the panel board portion is likely to be damaged due to stress concentration.

An object of the invention is to provide a pressure-resistant container which is less likely to be damaged due to stress concentration even in deep seas of 1000 m or deeper below sea level, and an exploration machine provided with the same.

Solution to Problem

The invention provides a pressure-resistant container, including:
a cylindrical first outer shell member; and
substantially hemispherical second outer shell members which have a common axis with the cylindrical first outer shell member, the substantially hemispherical second outer shell members being respectively connected to both ends of the cylindrical first outer shell member in such a state that the substantially hemispherical second outer shell members are disposed so as to be convex in a direction of being separated from the first outer shell member,
a Young's modulus $E2$ of a base material which constitutes the respective substantially hemispherical second outer shell members being smaller than a Young's modulus $E1$ of a base material which constitutes the cylindrical first outer shell member ($E2<E1$).

Furthermore, the invention provides an exploration machine including the pressure-resistant container mentioned above and an exploration module which is housed in the pressure-resistant container.

Advantageous Effects of Invention

According to the invention, since the cylindrical first outer shell member and the hemispherical second outer shell members connected to both ends of the first outer shell member are provided, and the Young's modulus $E2$ of the second outer shell member is smaller than the Young's modulus $E1$ of the first outer shell member, for example, in deep seas of 1000 m or deeper below sea level, when water pressure acts on the pressure-resistant container, a difference in a deformation amount in a connection portion between the first outer shell member and the second outer shell member becomes small as the Young's modulus $E2$ of the base material which constitutes the second outer shell member that is less likely to be deformed compared to the first outer shell member, is smaller than the Young's modulus $E1$ of the base material which constitutes the first outer shell member ($E2<E1$). For this reason, damage due to stress concentration is less likely to be generated in the connection portion between the first outer shell member and the second outer shell member.

In addition, according to the exploration machine of the invention, since the exploration module is housed in the pressure-resistant container of the invention which is less likely to be damaged due to stress concentration, it is possible to provide an exploration machine which has high reliability.

BRIEF DESCRIPTION OF DRAWINGS

An object, characteristics, and advantages of the invention can be known more clearly with reference to the detailed description below and the drawings.

DESCRIPTION OF EMBODIMENTS

Figure 1:
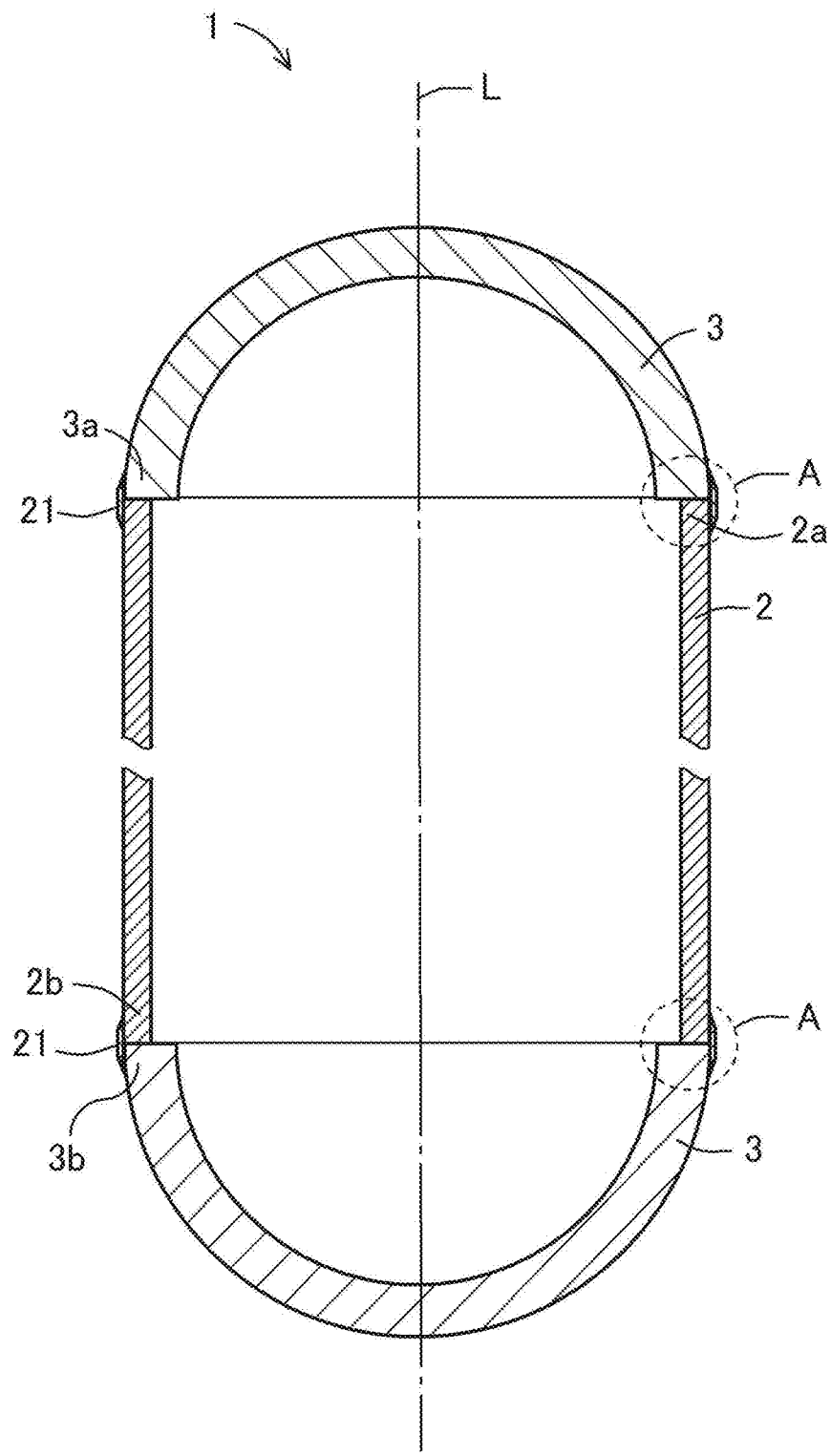
FIG. 1 is a cross-sectional view illustrating a pressure-resistant container according to one embodiment of the invention.

FIG. 1 is a cross-sectional view illustrating a pressure-resistant container 1 according to one embodiment of the invention. The pressure-resistant container 1 of the embodiment includes a tube-shaped, specifically, cylindrical first outer shell member 2, and hemispherical second outer shell members 3 which are connected to respective end portions 2a and 2b of the first outer shell member 2.

The second outer shell members 3 have a common axis L with the first outer shell member 2, and are respectively connected to the end portions 2a and 2b of the first outer shell member 2 in such a state that the second outer shell members 3 are disposed so as to be convex in a direction of being separated from the first outer shell member 2. A Young's modulus E2 of a base material which constitutes the second outer shell member 3 is smaller than a Young's modulus E1 of a base material which constitutes the first outer shell member 2 (E2<E1).

Here, the "Young's modulus" is a bulk modulus E (E=$\sigma/\epsilon$) which is a ratio between stress $\sigma$ that is generated when an elastic body is elastically deformed, and a volumetric strain $\epsilon$ that is generated due to the stress $\sigma$. In addition, in each of the following embodiments, the pressure-resistant container is described on the assumption that the pressure-resistant container is a linear elastic body which is isotropically homogeneous, for convenience of description.

Under high pressure in deep seas, when the cylindrical first outer shell member 2 and the hemispherical second outer shell member 3 have the same Young's modulus, or when the Young's modulus of the second outer shell member is greater than the Young's modulus of the first outer shell member, since a difference in deformation amount in a connection portion A between the first outer shell member 2 and the second outer shell member 3 is likely to become larger, damage due to stress concentration is likely to be generated in the connection portion A between the first outer shell member 2 and the second outer shell member 3.

Meanwhile, according to a configuration of the pressure-resistant container 1 of the embodiment, for example, in deep seas of 1000 m or deeper below sea level, when water pressure acts on the pressure-resistant container 1, the deformation amount of the second outer shell member 3 which is less likely to be deformed because of the shape compared to the first outer shell member 2 becomes larger. For this reason, the difference in the deformation amount in the connection portion A between the first outer shell member 2 and the second outer shell member 3 becomes smaller, and damage due to stress concentration is less likely to be generated in the connection portion A between the first outer shell member 2 and the second outer shell member 3.

The connection portion A is a part at which the end portion 2a or 2b of the first outer shell member 2 and an opening end 3a or 3b of the second outer shell member 3 face each other, and a part in the vicinity thereof. In addition, each of end surfaces of the end portions 2a and 2b of the first outer shell member 2 and the opening ends 3a and 3b, has an annular shape on a plane which is perpendicular to an axis L.

In particular, the pressure-resistant container 1 of the embodiment is preferable when the Young's modulus E2 of the second outer shell member 3 is ⅙ or more of the Young's modulus E1 of the first outer shell member 2. The inventors of the invention have performed deformation simulation of the pressure-resistant container 1 due to water pressure and have found that, when the Young's modulus of the second outer shell member 3 is ⅙ or more of the Young's modulus E1 of the first outer shell member 2, and less than the Young's modulus E1 of the first outer shell member 2 (E1>E2≥(⅙)×E1), there is a tendency for the difference in deformation of the end portions 2a and 2b of the first outer shell member 2 and the opening ends 3a and 3b of the second outer shell member 3 to become smaller, for the generation of stress in the connection portion A between the first outer shell member 2 and the second outer shell member 3 to be suppressed, and for the damage due to stress concentration to be further suppressed in the connection portion A between the first outer shell member 2 and the second outer shell member 3.

Furthermore, it has been found that, when the Young's modulus E2 of the second outer shell member 3 is ⅙ or more and ½ or less of the Young's modulus E1 of the first outer shell member 2 (E1×½≥E2≥E1×⅙), there is a tendency for the generation of stress to be particularly suppressed in the connection portion A between the first outer shell member 2 and the second outer shell member 3, and the damage due to stress concentration to be suppressed in the connection portion A between the first outer shell member 2 and the second outer shell member 3.

Furthermore, in the pressure-resistant container 1 of the invention, under high pressure in deep seas, the second outer shell member 3 having a low Young's modulus is in such a state that the second outer shell member 3 is pressed to a surface of the first outer shell member 2 having a high Young's modulus, and is likely to be deformed along the surface of the end portion of the first outer shell member 2. For this reason, an extremely small gap or the like is less likely to be formed and the second outer shell member 3 is likely to be adhered. In other words, reliability of the pressure-resistant container 1 increases.

In addition, when adhesion in the connection portion A between the first outer shell member 2 and the second outer shell member 3 is considered from the viewpoint of a contact area, as described above, since the extremely small gap per unit area of the contact area between the first outer shell member 2 and the second outer shell member 3 is reduced as the second outer shell member 3 is likely to be deformed, the first outer shell member 2 and the second outer shell member 3 are more excellently adhered to each other. Therefore, adhesion in the connection portion A between the first outer shell member 2 and the second outer shell member 3 is improved.

Therefore, in the pressure-resistant container 1 of the embodiment, it is not necessary to, as described in the related art, be provided with a rib on outer circumferential sides of the first outer shell member 2 and the second outer shell member 3 and to use a combining member such as a bolt. In other words, in the pressure-resistant container 1, for example, in deep seas of 1000 m or deeper below sea level, as water pressure acts on the pressure-resistant container 1, as described above, since adhesion in the connection portion A between the first outer shell member 2 and the second outer shell member 3 is improved, it is possible to ensure high reliability even when the combining member is not used.

In addition, the pressure-resistant container 1 which is not provided with the rib on the outer circumferential sides of the first outer shell member 2 and the second outer shell member 3, that is, the pressure-resistant container 1 in which the outer circumferential surface of the first outer shell member 2 and the outer circumferential surface of the second outer shell member 3 are continuous to be flush with each other, is likely to be moved in water since fluid resistance becomes smaller in water, and is preferable for use in water. Furthermore, such a pressure-resistant container 1 is preferable from the viewpoint of manufacturing cost since a combining structure such as a rib or a combining member such as a bolt is not used on an outer circumference of the pressure-resistant container, and is also preferable from the viewpoint of productivity since a manufacturing process of providing a rib on the outer circumferential side or a manufacturing process of combining the first outer shell member 2 and the second outer shell member 3 on the outer circumferential side by a combining member such as a bolt, is omitted.

In the connection portion A, in order to more securely connect the end portions 2a and 2b of the first outer shell member 2 and the opening ends 3a and 3b of the second outer shell members 3, it is possible to use a combining member such as a bolt or a self-welding rubber, as necessary.

Here, the pressure-resistant container 1 illustrated in FIG. 1 is an example in which a commercial self-welding rubber 21 is attached to the outer circumferential surface of the pressure-resistant container 1 so as to cover the connection portion A between the first outer shell member 2 and the second outer shell member 3. The same applies in the following drawings. According to this, it is possible to securely connect the first outer shell member 2 and the second outer shell member 3. In addition, in other examples other than the above-described example, for example, by providing a through hole which passes through the second outer shell member 3 from the outer circumference to the inside of the tube, connecting a vacuum pump to the through hole, and reducing pressure inside the pressure-resistant container 1, it is possible to enhance air-tightness. In addition, when an electronic device is used inside the pressure-resistant container 1, it is possible to connect an electronic device inside the pressure-resistant container and an electronic device outside the pressure-resistant container by wiring from the through hole. Even in deep seas of 1000 m or deeper below sea level, for example, the pressure-resistant container 1 is highly convenient for use since damage due to stress concentration is suppressed in the connection portion A between the first outer shell member 2 and the second outer shell member 3.

In addition, in the pressure-resistant container 1 illustrated in FIG. 1, an example in which, in the connection portion A between the first outer shell member 2 and the second outer shell member 3, a thickness of the second outer shell member 3 is greater than a thickness of the first outer shell member 2, and the second outer shell member 3 is disposed to protrude to the inside of the pressure-resistant container 1 compared to the first outer shell member 2, is illustrated.

When the pressure-resistant container 1 is moved in deep seas, it is preferable to pull the pressure-resistant container 1 in a direction of the axis L in order to reduce water resistance. However, when the pressure-resistant container 1 is pulled in this manner, the second outer shell member 2 is likely to come into contact with rocks or the like in the seabed. Therefore, by making the thickness of the second outer shell member 3 greater than the thickness of the first outer shell member 2, it is possible to enhance durability. As a ratio between the thickness of the first outer shell member 2 and the thickness of the second outer shell member 3, when the thickness of the first outer shell member 2 is T1 and the thickness of the second outer shell member 3 is T2, it is preferable to set T2/T1 to be 1.2 or more and 2.5 or less. When T2/T1 is 1.2 or more and 2.5 or less, it is possible to enhance durability without excessively increasing weight of the pressure-resistant container 1.

Furthermore, when the pressure-resistant container 1 is used under high pressure in deep seas or the like, there is a concern that the second outer shell member 3 is excessively deformed as the second outer shell member 3 receives stress due to water pressure. Here, when the second outer shell member 3 is excessively deformed, there is a concern that deviation is generated in the connection portion A between the first outer shell member 2 and the second outer shell member 3, and air-tightness deteriorates. In addition to this, when, for example, the second outer shell member 3 is deformed to protrude to the outside, there is a concern that fluid resistance in water becomes larger, and it becomes difficult to move the pressure-resistant container 1 in water.

Therefore, in the pressure-resistant container 1 illustrated in FIG. 1, the thickness of the second outer shell member 3 is greater than the thickness of the first outer shell member 2, and the second outer shell member 3 is disposed to protrude to the inside of the pressure-resistant container 1, that is, the second outer shell member 3 is disposed so that the outer circumferential surfaces between the second outer shell member 3 and the first outer shell member 2 are continuous to be flush with each other. Accordingly, it is possible to suppress excessive deformation of the second outer shell member 3, to hold air-tightness, and to suppress an increase in fluid resistance in water.

Here, in the pressure-resistant container 1 of the embodiment, from the viewpoint of mechanical strength, it is preferable that the first outer shell member 2 is made of ceramics, and the second outer shell member 3 is made of metal.

In addition, the pressure-resistant container 1 in which the first outer shell member 2 is made of ceramics and the second outer shell member 3 is made of metal is preferable since the difference in deformation amount in the connection portion A between the first outer shell member 2 and the second outer shell member 3 under high pressure in deep seas is further reduced compared to a pressure-resistant container in the related art in which both first outer shell member 2 and second outer shell member 3 are made of ceramics (hereinafter, referred to as a pressure-resistant container made of only ceramics).

Specifically, since the ceramics generally have high compressive strength and low tensile strength, in the pressure-resistant container made of only ceramics, when the second outer shell member 3 is pressed in the direction of the axis L under high pressure in deep seas, because of the structure, tensile stress is likely to be generated in the vicinity of the opening end 3a or 3b of the second outer shell member 3, and higher tensile stress is generated compared to the end portions 2a and 2b of the first outer shell member 2. For this reason, the difference in the deformation amount in the connection portion A between the first outer shell member 2 and the second outer shell member 3 is more likely to be generated under high pressure in deep seas.

However, in the pressure-resistant container 1 in which the first outer shell member 2 is made of ceramics and the second outer shell member 3 is made of metal, since metal which generally has higher tensile strength than that of the ceramics is used in the second outer shell member 3, compared to the pressure-resistant container made of only ceramics, the difference in the deformation amount in the connection portion A between the first outer shell member 2 and the second outer shell member 3 becomes smaller under high pressure in deep seas, and damage due to stress concentration is further suppressed in the connection portion A between the first outer shell member 2 and the second outer shell member 3.

In addition, compared to a pressure-resistant container in which both the first outer shell member 2 and the second outer shell member 3 are made of metal (hereinafter, referred to as a pressure-resistant container made of only metal), since the pressure-resistant container 1 in which the first outer shell member 2 is made of ceramics and the second outer shell member 3 is made of metal uses ceramics having a specific gravity which is generally smaller than that of metal in the first outer shell member 2, buoyancy becomes higher than that of the pressure-resistant container made of only metal. In other words, when the pressure-resistant container 1 in which the first outer shell member 2 is made of ceramics and the second outer shell member 3 is made of metal is mounted on an unmanned exploration machine described below, it is possible to reduce an amount of a buoyant material which is mounted on the unmanned exploration machine, and to easily reduce the size of the unmanned exploration machine and manufacturing cost thereof.

In other words, in the pressure-resistant container 1 in which the first outer shell member 2 is made of ceramics and the second outer shell member 3 is made of metal, since the difference in the deformation amount in the connection portion A between the first outer shell member 2 and the second outer shell member 3 becomes smaller under high pressure in deep seas, damage due to stress concentration is less likely to be generated in the connection portion A between the first outer shell member 2 and the second outer shell member 3, and both high mechanical strength and high buoyancy are provided.

Specifically, as the first outer shell member 2, for example, it is possible to use ceramics such as alumina, zirconia, silicon nitride, or silicon carbide, and as the second outer shell member 3, for example, it is possible to use metal such as stainless steel, a titanium alloy, or an aluminum alloy.

Furthermore, when the aluminum alloy is selected as the second outer shell member 3, since duralumin 5056, 5051, or A6061 has high strength and high corrosion resistance with respect to seawater, it is more preferable to use such duralumin. In addition, it is possible to configure both the first outer shell member 2 and the second outer shell member 3 by ceramics, and in this case, for example, the first outer shell member 2 may be configured of alumina or silicon carbide which has a high Young's modulus, and the second outer shell member 3 may be configured of silicon nitride or zirconia which has a Young's modulus lower than that of the alumina or silicon carbide.

<Manufacturing Method>

Next, a manufacturing method of the pressure-resistant container 1 will be described. In the pressure-resistant container 1 illustrated in FIG. 1, first, the cylindrical first outer shell member 2 can be manufactured by using various ceramics such as alumina, zirconia, silicon nitride, and silicon carbide. Hereinafter, a manufacturing method of the first outer shell member 2 using alumina, zirconia, silicon nitride, and silicon carbide, will be described.

(1) Manufacturing Method of First Outer Shell Member 2 Using Alumina

An alumina material having an average particle diameter of approximately 1 μm and a sintering additive such as CaO, $SiO_2$, or MgO, are used as a primary raw material. A binder such as polyvinyl alcohol (PVA), a solvent such as water, and a dispersant such as various types of surfactants, are respectively measured to be 1 to 1.5% by mass, 100% by mass, and 0.5% by mass, with respect to 100% by mass of the primary raw material, these materials are put into a container of a stirrer, mixed and stirred, and after making these materials into a slurry, granulation is performed according to a spray granulation (spray dry) method, whereby a secondary raw material is made.

Then, the secondary raw material is molded in a cylindrical shape by an isostatic press molding (rubber pressing) method, cutting processing is performed as necessary, and then, firing is performed at a firing temperature of 1550 to 1700° C. in an atmosphere by a firing furnace. After the firing, final finishing processing such as polishing processing, is performed, and the cylindrical first outer shell member 2 which is made of an alumina sintered body can be obtained.

(2) Manufacturing Method of First Outer Shell Member 2 Using Zirconia

Zirconia which has a $Y_2O_3$ adding amount of 3 mol %, is prepared by a co-precipitation method, and has an average particle diameter of 0.1 μm is used as a primary raw material. A binder such as polyvinyl alcohol (PVA), a solvent such as water, and a dispersant such as various types of surfactants, are respectively measured to be 3% by mass, 100% by mass, and 0.5% by mass, with respect to 100% by mass of the primary raw material, these materials are put into a container of a stirrer, mixed and stirred, and after making these materials into a slurry, granulation is performed according to a spray granulation (spray dry) method, whereby a secondary raw material is made.

Then, the secondary raw material is molded in a cylindrical shape by an isostatic press molding (rubber pressing) method, cutting processing is performed as necessary, and then, firing is performed at a firing temperature of 1300 to 1500° C. in an atmosphere by a firing furnace. After the firing, final finishing processing such as polishing processing, is performed, and the cylindrical first outer shell member 2 which is made of a zirconia sintered body can be obtained.

(3) Manufacturing Method of First Outer Shell Member 2 Using Silicon Nitride

A silicon nitride raw material which has a purity of 99% to 99.8% and an average particle diameter of 1 μm, and a sintering additive such as $Y_2O_3$ or $Al_2O_3$, are used as a primary raw material. A binder such as polyvinyl alcohol (PVA) or polyethylene glycol (PEG), a solvent such as water, and a dispersant such as various types of surfactants, are respectively measured to be 1% by mass, 100% by mass, and 0.5% by mass or less (except for 0% by mass), with respect to 100% by mass of the primary raw material, these materials are put into a container of a stirrer, mixed and stirred, and after making these materials into a slurry, granulation according to a spray granulation (spray dry) method is performed, whereby a secondary raw material is made.

Then, the secondary raw material is molded in a cylindrical shape by an isostatic press molding (rubber pressing) method, cutting processing is performed as necessary, and then, firing is performed at 1900° C. as a maximum temperature in a nitrogen atmosphere by a firing furnace. After the firing, final finishing processing such as polishing processing, is performed, and the cylindrical first outer shell member 2 which is made of a silicon nitride sintered body can be obtained.

(4) Manufacturing Method of First Outer Shell Member 2 Using Silicon Carbide

A silicon carbide raw material which has a purity of 99% to 99.8% and an average particle diameter of 0.5 μm to 10 μm, and a sintering additive such as C (graphite), $B_2O_3$, $Al_2O_3$, or $Y_2O_3$, are pulverized by a pulverizer such as a ball mill so that the average particle diameter becomes 1 μm or less. Furthermore, appropriate amount of the binder such as polyethylene glycol (PEG) or polyethylene oxide (PEO), is added, and after making these materials into a slurry, granulation according to a spray granulation (spray dry) method is performed, whereby a secondary raw material is made.

Then, the secondary material is molded in a cylindrical shape by an isostatic press molding (rubber pressing) method, cutting processing is performed as necessary, and then, firing is performed at a firing temperature of 1800 to 2200° C. in a non-oxidizing atmosphere by a firing furnace. After the firing, final finishing processing such as polishing processing, is performed, and the cylindrical first outer shell member 2 which is made of a silicon carbide sintered body can be obtained.

In this manner, it is possible to employ a ceramic material such as alumina, zirconia, silicon nitride, and silicon carbide, as a material of the first outer shell member 2, and to configure a member of the pressure-resistant container 1 from the viewpoint of a test result of basic characteristics or a manufacturing technology. A most appropriate material may be selected in accordance with the desired characteristics such as usage of the pressure-resistant container 1, a use method, or water pressure, and from the viewpoint of manufacturing cost or wear resistance in a case of being in contact with rocks in the seabed, alumina is excellent, and from the viewpoint of weight reduction or reliability, the pressure-resistant container made of silicon nitride is excellent.

In addition, in the pressure-resistant container 1 illustrated in FIG. 1, the second outer shell member 3 can be manufactured by using a metal material such as stainless steel, a titanium alloy, and an aluminum alloy. By using a method such as forging, the metal material is molded in such a shape that the second outer shell member 3 can be machined, and after obtaining a molded body which is made of the metal material, the second outer shell member 3 can be obtained by performing processing to make the shape of the second outer shell member 3 by performing cutting processing with respect to the molded body.

Figure 2:
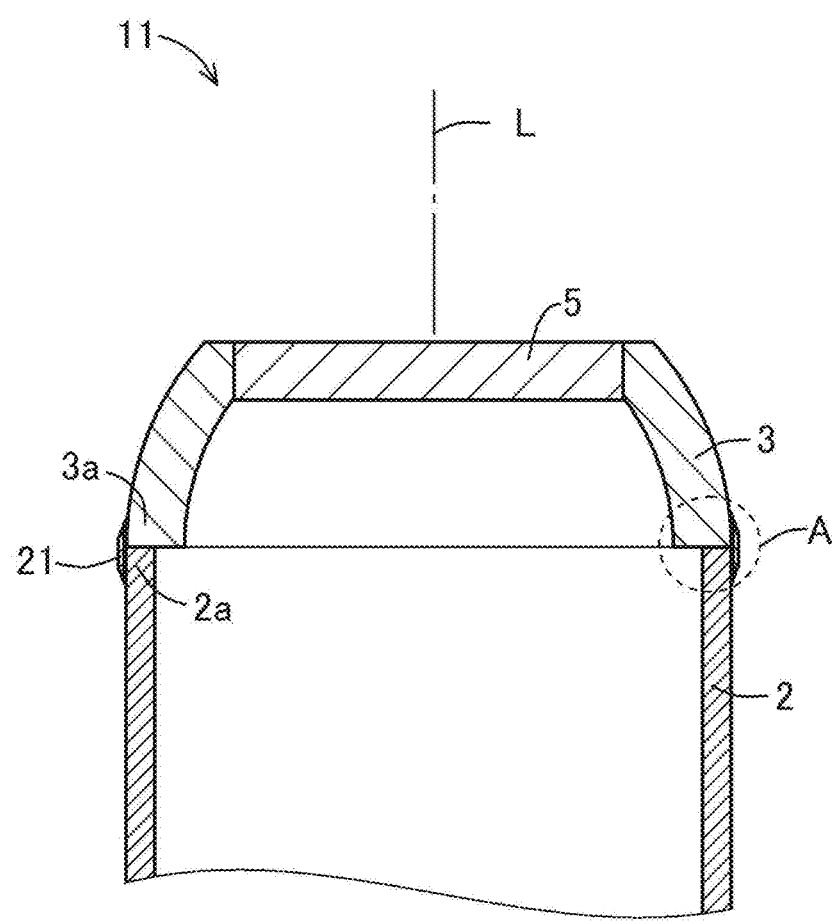
FIG. 2 is a cross-sectional view illustrating a part of a pressure-resistant container according to another embodiment of the invention.

FIG. 2 is a cross-sectional view illustrating a part of a pressure-resistant container 11 according to another embodiment of the invention. Herein, parts corresponding to the above-described embodiment are given the same reference numerals, and the description thereof will be omitted to avoid repetition. While the entire second outer shell member 3 may be in a hemispherical shape in the pressure-resistant container 1 of the above-described embodiment, from the viewpoint of durability, as illustrated in FIG. 2, a part which is employed instead of the convex portion of the hemispherical body may be a flat portion 5 which is perpendicular to the axis L in the pressure-resistant container 11 in the embodiment. In the pressure-resistant container 11 which is provided with the flat portion 5 in this manner, by using the flat portion 5, it is possible to easily install various devices such as an underwater connector, a small-sized camera, a measuring device, or a sensor, in the pressure-resistant container 11.

Figure 3:
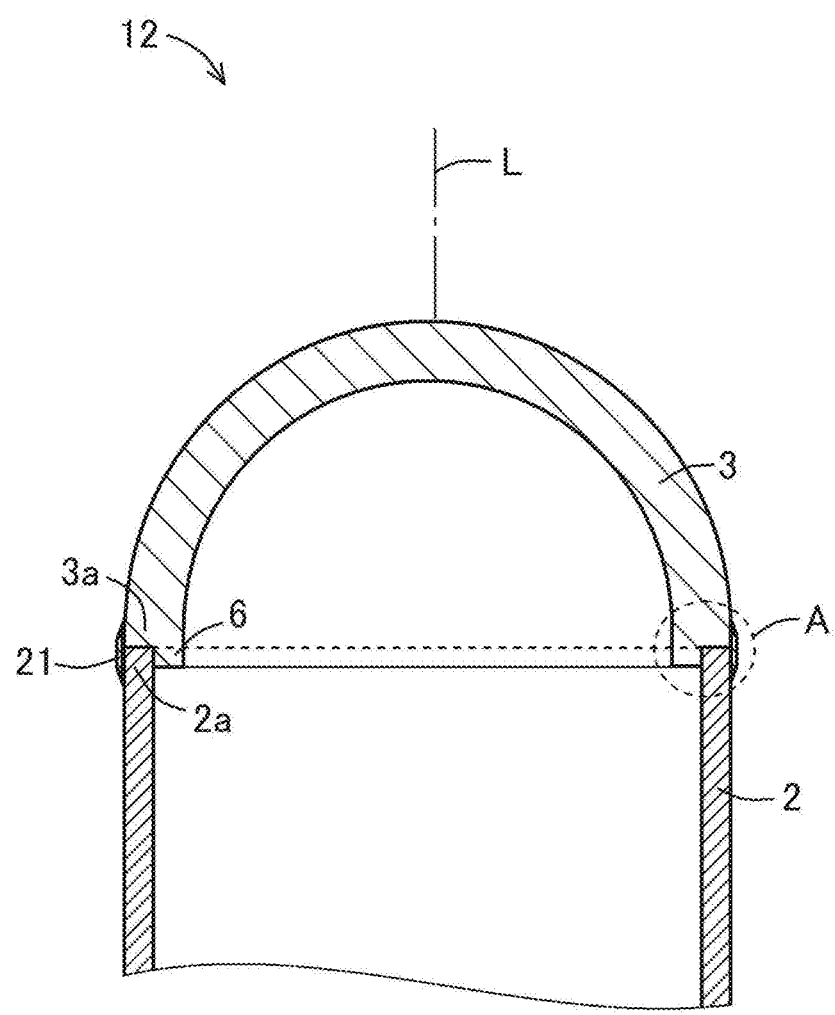
FIG. 3 is a cross-sectional view illustrating a part of a pressure-resistant container according to still another embodiment of the invention.

FIG. 3 is a cross-sectional view illustrating a part of a pressure-resistant container 12 according to still another embodiment of the invention. Herein, parts corresponding to the above-described embodiment are given the same reference numerals, and the description thereof will be omitted to avoid repetition. In the pressure-resistant container 12 of the embodiment, the second outer shell member 3 is provided with an annular convex portion 6 to which the end portion 2a or 2b of the first outer shell member 2 is fitted, on the inner circumferential side of the connection portion A between the first outer shell member 2 and the second outer shell member 3.

According to such a configuration, without changing the shape of the outer surface of the pressure-resistant container 12, it is possible to increase the contact area between the first outer shell member 2 and the second outer shell member 3, and to further improve sealing performance. In other words, without changing flow resistance with respect to water on the outer circumferential surface of the pressure-resistant container 12, it is possible to improve sealing performance in the connection portion A between the first outer shell member 2 and the second outer shell member 3.

Figure 4:
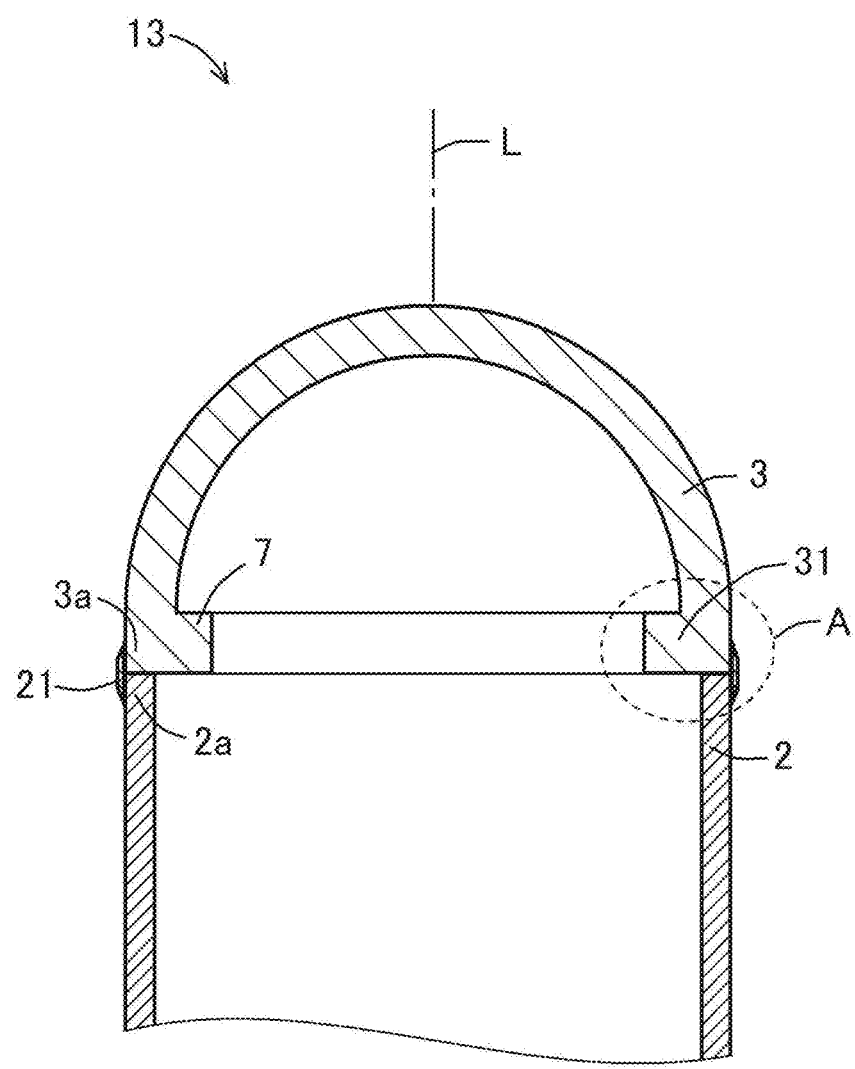
FIG. 4 is a cross-sectional view illustrating a part of a pressure-resistant container according to still another embodiment of the invention.

FIG. 4 is a cross-sectional view illustrating a part of a pressure-resistant container 13 according to still another embodiment of the invention. Herein, parts corresponding to the above-described embodiment are given the same reference numerals, and the description thereof will be omitted to avoid repetition. In the pressure-resistant container 13 of the embodiment, the second outer shell member 3 is provided with an annular flange portion 7 which protrudes to the inner circumferential side, that is, inwardly in a radial direction thereof, in an end portion 31 on the connection portion A side between the first outer shell member 2 and the second outer shell member 3.

According to such a configuration, when an outer surface of the pressure-resistant container 13 receives water pressure, it is possible to suppress deformation of the end portion 31 on the connection portion A side of the second outer shell member 3 in which stress is likely to be concentrated and deformation is likely to occur, by the flange portion 7. For this reason, since the difference in the deformation amount in the connection portion A between the first outer shell member 2 and the second outer shell member 3 becomes smaller under high pressure in deep seas, it is possible to further suppress damage due to stress concentration of the connection portion A between the first outer shell member 2 and the second outer shell member 3.

In addition, the flange portion 7 and the second outer shell member 3 may be made of different metals, and if a material which is appropriately selected from metal having a Young's modulus lower than that of metal of the second outer shell member 3 such as aluminum, an aluminum alloy, titanium, or a titanium alloy, is used in the flange portion 7, compared to a case where the flange portion 7 and the second outer shell member 3 are integrally formed of the same type of metal, it is possible to improve sealing performance of the pressure-resistant container 13 by the flange portion 7 which has a less volume, and to maintain a larger capacity in the pressure-resistant container 13.

Figure 5:
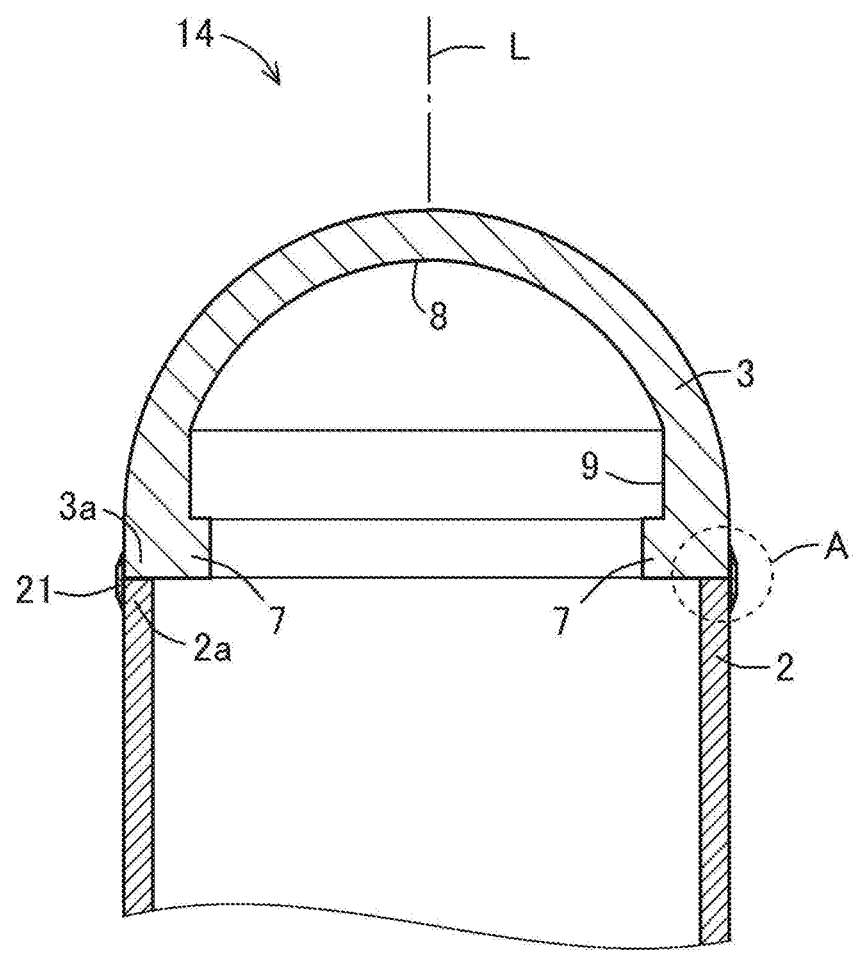
FIG. 5 is a cross-sectional view illustrating a part of a pressure-resistant container according to still another embodiment of the invention.

FIG. 5 is a cross-sectional view illustrating a part of a pressure-resistant container 14 according to still another embodiment of the invention. Herein, parts corresponding to the above-described embodiment are given the same reference numerals, and the description thereof will be omitted to avoid repetition. The pressure-resistant container 14 of the embodiment has a cylindrical smooth surface 9 which has the common axis L with the flange portion 7 on an inner circumferential surface 8 side of the second outer shell member 3.

According to such a configuration, when water pressure acts on the pressure-resistant container 14 in deep seas, since the second outer shell member 3 is likely to be more intensely pressed to the first outer shell member 2 in the direction of the axis L in a uniform state, it is possible to further improve adhesion between the first outer shell member 2 and the second outer shell member 3.

Figure 6:
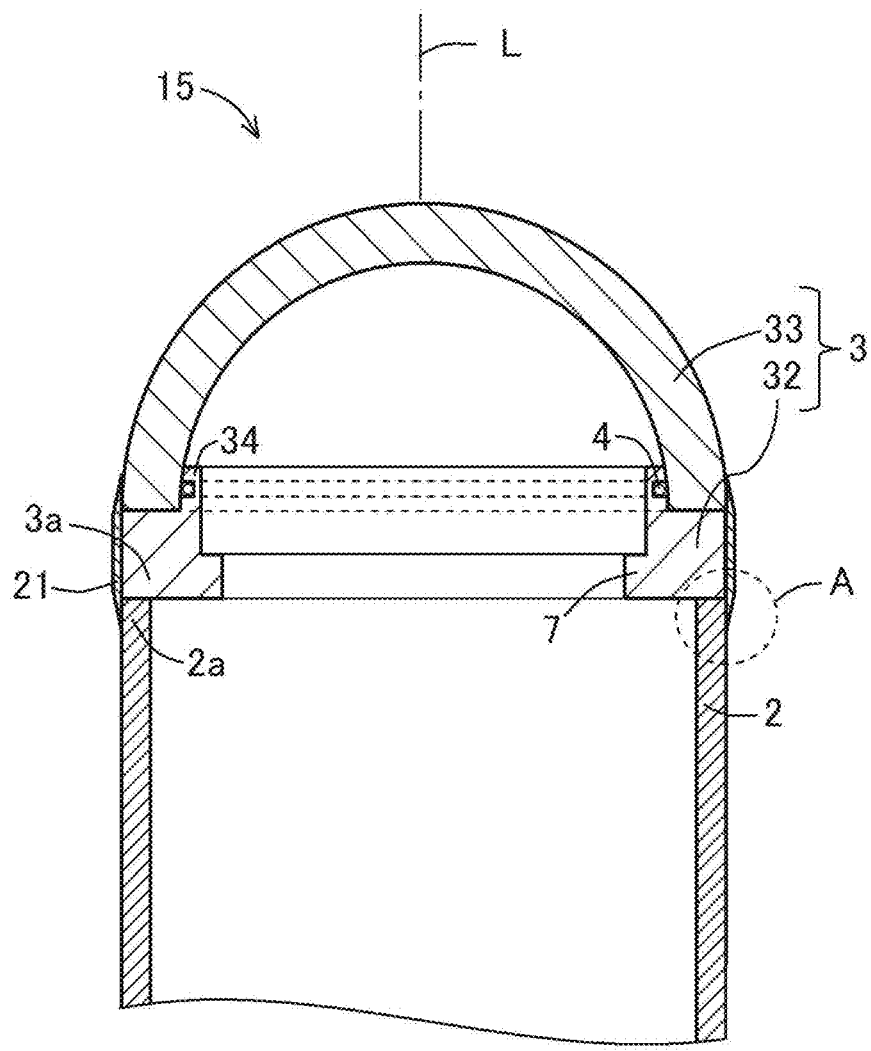
FIG. 6 is a cross-sectional view illustrating a part of a pressure-resistant container according to still another embodiment of the invention.

FIG. 6 is a cross-sectional view illustrating a part of a pressure-resistant container 15 according to still another embodiment of the invention. Herein, parts corresponding to the above-described embodiment are given the same reference numerals, and the description thereof will be omitted to avoid repetition. In the pressure-resistant container 15 of the embodiment, the second outer shell member 3 has a composite structure which is composed of a first member 32 and a second member 33. Herein, Young's moduli E3 and E4 of the first member 32 and the second member 33 are smaller than the Young's modulus E1 of the first outer shell member 2 (E3<E1, and E4<E1).

Specifically, in the second outer shell member 3, the first member 32 disposed on the connection portion A side is provided with a protrusion portion 34 which has an outer diameter that is equal to or slightly smaller than an inner diameter of the second member 33. In addition, the second member 33 is fitted to the protrusion portion 34 of the first member 32, is fitted in state where an O-ring 4 is interposed between an opening circumferential edge portion of the second member 33 and the protrusion portion 34, and is fixed with high water-tightness even at 1000 m or shallower below sea level. In other words, at 1000 m or shallower below sea level, since water pressure which is applied to the pressure-resistant container 15 is low, sealing performance of the pressure-resistant container 15 by water pressure becomes weaker, but by interposing the O-ring 4, it is possible to strengthen sealing performance of the pressure-resistant container 15 in deep seas of 1000 m or shallower below sea level.

According to such a configuration, even when the contact surface between the first outer shell member 2 and the second outer shell member 3 is worn out by excessive use, only the first member 32 may be exchanged, and thus, economic feasibility is high.

In addition, when pressure acts in deep seas, as a base material which constitutes the first member 32 that corresponds to a part which is more likely to be deformed, a base material which has a Young's modulus which is higher than that of a base material which constitutes the second member 33 is preferable.

Figure 7:
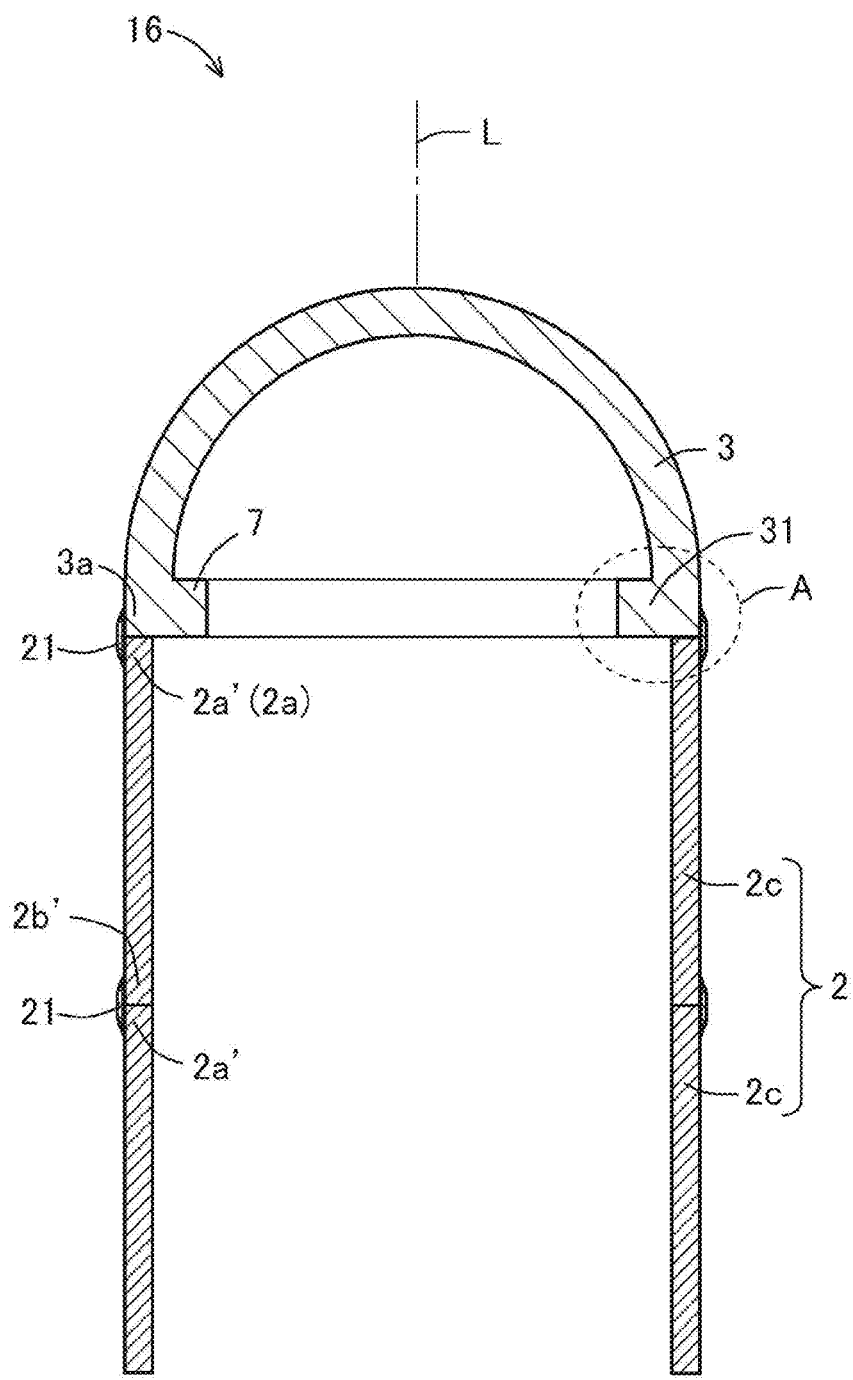
FIG. 7 is a cross-sectional view illustrating a part of a pressure-resistant container according to still another embodiment of the invention.

FIG. 7 is a cross-sectional view illustrating a part of a pressure-resistant container 16 according to still another embodiment of the invention. Herein, parts corresponding to the above-described embodiment are given the same reference numerals, and the description thereof will be omitted to avoid repetition. In the pressure-resistant container 16 of the embodiment, the first outer shell member 2 is composed of a plurality of cylindrical members 2c which are coupled to each other in the direction of the axis L. Herein, end portions of each cylindrical member 2c are given reference numerals 2a' and 2b'.

Here, in the first outer shell member 2 which is composed of a single cylindrical member, because of the structure thereof, the deformation amount with respect to water pressure becomes larger in the end portions 2a and 2b compared to the vicinity of a center portion of the direction of the axis L. In other words, in deep seas, in the first outer shell member 2 which is composed of a single cylindrical member, there is a tendency for stress concentration to be generated in the center portion due to the difference in the deformation amount between the end portions 2a and 2b and the center portion between both end portions.

Meanwhile, since the first outer shell member 2 is composed of the plurality of cylindrical members 2c in the pressure-resistant container 16 illustrated in FIG. 7, stress concentration is generated in the center portion between each of the end portions 2a' and 2b' of the plurality of cylindrical members 2c. In other words, since the parts where stress concentration is generated are dispersed, locally high stress concentration is less likely to be generated compared to the first outer shell member 2 which is composed of a single cylindrical member 2c. In other words, durability of the pressure-resistant container 16 is enhanced.

<Measuring Method of Young's Modulus>

Young's moduli of the first outer shell member 2 and the second outer shell member 3 of the pressure-resistant containers 1, 11, 12, 13, 14, 15, and 16 according to the invention may be obtained by measuring a static Young's modulus at a room temperature according to JIS Z 2280:1993 when the material of the member is metal, by slicing out specimens from each of the first outer shell member 2 and the second outer shell member 3. In addition, when the material of the member is ceramic, Young's moduli may be obtained by measuring a static Young's modulus at a room temperature according to JIS R 1602:1995.

<Unmanned Exploration Machine>

Next, an application example of the above-described pressure-resistant container 1 will be described. Herein, since any of the pressure-resistant containers 1, and 11 to 16 in each of the above-described embodiments can be mounted on exploration machines 51 and 60 which will be described in the following, a case where the pressure-resistant container 1 illustrated in FIG. 1 is provided will be described as an example. Herein, parts corresponding to the above-described embodiment are given the same reference numerals, and the description thereof will be omitted to avoid repetition.

Figure 8:
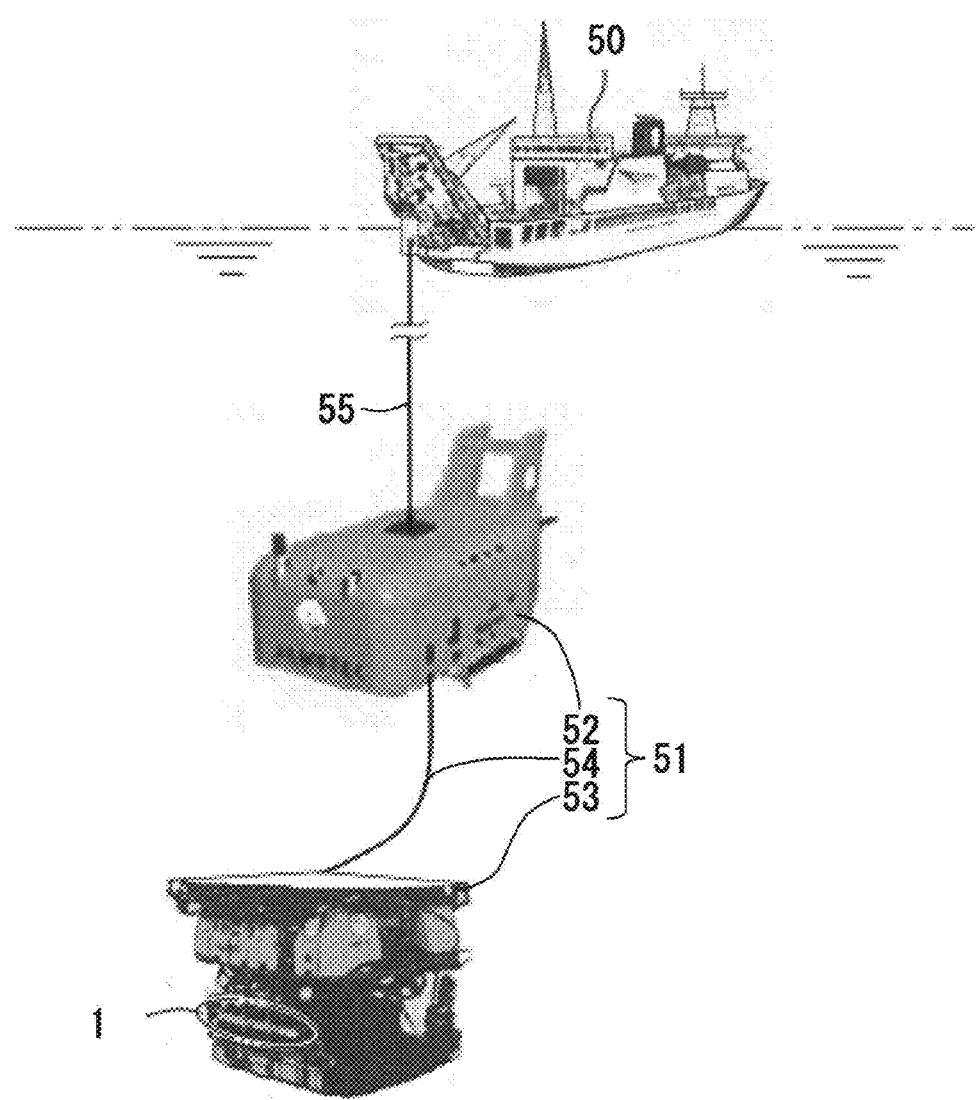
FIG. 8 is a view illustrating an external appearance of an exploration machine which is provided with the pressure-resistant container according to the embodiment of the invention.

FIG. 8 is a view illustrating an external appearance of the exploration machine 51 according to the embodiment of the invention. The exploration machine 51 of the embodiment is an unmanned remote control type exploration machine, and includes: the above-described pressure-resistant container 1; an exploration machine main body 53 which is provided with various devices that are exploration modules housed in the pressure-resistant container 1 and an observation device; and a thruster 52 which is connected to the exploration machine main body 53 by a tether cable 54.

The exploration machine main body 53 is configured to include the above-described pressure-resistant container 1, an exterior member such as a bumper or a frame that protects the pressure-resistant container 1, a buoyant material and so on.

The thruster 52 is connected to a tether cable 55 which is stretched from a ship 50 at sea, electricity is supplied to the exploration machine main body 53 and the thruster 52 from the ship 50 via the tether cables 54 and 55, and bilateral communication is possible among a communication device which is installed in the ship 50 and various devices of the exploration machine main body 53, the observation device, and the thruster 52. In other words, the exploration machine 51 moves by the thruster 52 being remotely operated from above the ship 50, and can observe data obtained by the observation device provided in the exploration machine main body 53 on the ship 50.

In another embodiment of the invention, instead of the pressure-resistant container 1, any one of the above-described pressure-resistant containers 11, 12, 13, 14, 15, and 16 may be selectively provided in the exploration machine main body 53.

Figure 9:
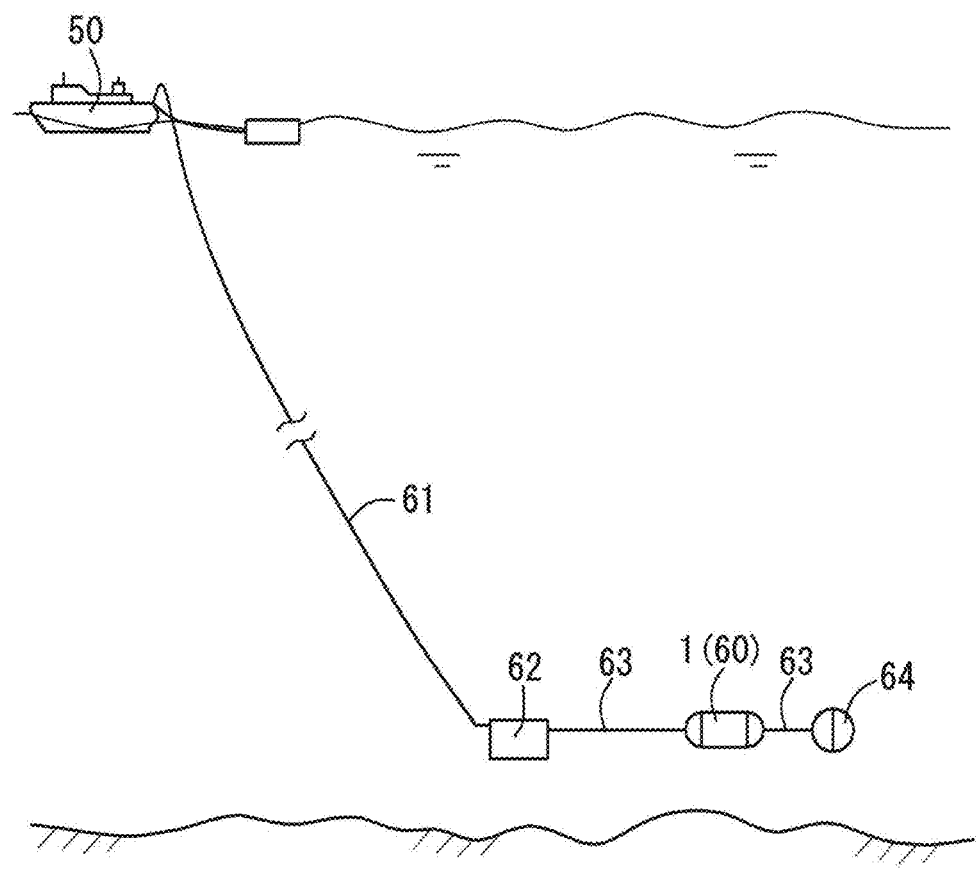
FIG. 9 is a view illustrating an external appearance of an exploration machine which is provided with the pressure-resistant container according to another embodiment of the invention.

FIG. 9 is a cross-sectional view illustrating an external appearance of an exploration machine 60 according to another embodiment of the invention. Herein, parts corresponding to the above-described embodiment are given the same reference numerals, and the description thereof will be omitted to avoid repetition. The exploration machine 60 of the embodiment is a towing type unmanned exploration machine, and a plumb-bob 62 is attached to a tether cable 61 which is stretched from the ship 50 at sea. In order to reduce magnetic noise, the pressure-resistant container 1 which houses a battery, the observation device, and the exploration module such as a sensor, is connected to the plumb-bob 62 by a nylon rope 63. In addition, a buoyant material 64 may be attached to the pressure-resistant container 1.

When the ship 50 tows the exploration machine 60, it is possible to collect data which is observed underwater by the observation device or the sensor which is housed in the pressure-resistant container 1.

In another embodiment of the invention, instead of the pressure-resistant container 1, any one of the above-described pressure-resistant containers 11, 12, 13, 14, 15, and 16 may be selectively provided.

According to the exploration machines 51 and 60, since the exploration module is housed in the pressure-resistant container 1 of the invention which is less likely to be damaged due to stress concentration, it is possible to make an exploration machine which has high reliability.

The pressure-resistant container of the invention can be utilized as a pressure-resistant container which is used in deep seas such as a manned submersible research ship, a seabed installation type observation device, or an Argo float, in addition to the above-described exploration machine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1, 11, 12, 13, 14, 15, 16: Pressure-resistant container
2: First outer shell member
3: Second outer shell member
5: Flat portion
4: O-ring
6: Convex portion
7: Flange portion
8: Inner circumferential surface
9: Smooth surface
21: Self-welding rubber
31: End portion on the connection portion A side
32: First member
33: Second member
34: Protrusion portion
50: Ship
51: Exploration machine
52: Thruster
53: Exploration machine main body
54, 55, 61: Tether cable
60: Exploration machine
62: Plumb-bob
63: Rope
64: Buoyant material
A: Connection portion

The invention claimed is:

1. A pressure-resistant container, comprising:
a first outer shell member composed of a cylindrical member; and
second outer shell members composed of a substantially hemispherical member;
wherein
the second outer shell members have a common axis with the first outer shell member, the second outer shell members being respectively connected to both ends of the first outer shell member in such a state that the second outer shell members are disposed so as to be convex in a direction of being separated from the first outer shell member, and
a Young's modulus E2 of a base material which constitutes the second outer shell members is smaller than a Young's modulus E1 of a base material which constitutes the first outer shell member (E2<E1), and
a thickness of each of the second outer shell members is greater than a thickness of the first outer shell member.

2. The pressure-resistant container according to claim 1, wherein the second outer shell members have a convex portion which is fitted to an inner circumference of an end portion of the first outer shell member.

3. The pressure-resistant container according to claim 1, wherein the second outer shell members have an annular flange portion which protrudes inwardly in a radial direction thereof from a part of the second outer shell members which part is connected to an end portion of the first outer shell member.

4. The pressure-resistant container according to claim 3, wherein a part of an inner circumferential surface of the second outer shell members which part is continuous to the flange portion, has a cylindrical smooth surface which has a common axis with the flange portion.

5. The pressure-resistant container according to claim 1, wherein the first outer shell member is made of ceramics, and the second outer shell members are made of metal.

6. The pressure-resistant container according to claim 5, wherein the first outer shell member is composed of a plurality of cylindrical members which are connected with each other in an axial direction thereof.

7. An exploration machine, comprising:
the pressure-resistant container according to claim 1; and
an exploration module which is housed in the pressure-resistant container.

* * * * *